US009584529B2

United States Patent
Su et al.

(10) Patent No.: US 9,584,529 B2
(45) Date of Patent: Feb. 28, 2017

(54) METHOD AND SYSTEM FOR OBTAINING PERIPHERAL INFORMATION, AND LOCATION PROXY SERVER

(71) Applicant: Tencent Technology (Shenzhen) Company Ltd., Shenzhen (CN)

(72) Inventors: Xiaokang Su, Shenzhen (CN); Shiqing Fan, Shenzhen (CN); Yonghua Li, Shenzhen (CN); Xuming Yu, Shenzhen (CN)

(73) Assignee: TENCENT TECHNOLOGY (SHENZHEN) COMPANY LTD., Shenzhen, GD, (CN)

( * ) Notice: Subject to any disclaimer, the term of this patent is extended or adjusted under 35 U.S.C. 154(b) by 36 days.

(21) Appl. No.: 14/125,798

(22) PCT Filed: Dec. 17, 2012

(86) PCT No.: PCT/CN2012/086750
§ 371 (c)(1),
(2) Date: Dec. 12, 2013

(87) PCT Pub. No.: WO2013/097623
PCT Pub. Date: Jul. 4, 2013

(65) Prior Publication Data
US 2014/0304502 A1    Oct. 9, 2014

(30) Foreign Application Priority Data
Dec. 29, 2011 (CN) .......................... 2011 1 0452331

(51) Int. Cl.
*H04L 29/06* (2006.01)
*H04W 4/02* (2009.01)

(52) U.S. Cl.
CPC .............. *H04L 63/107* (2013.01); *H04W 4/02* (2013.01); *H04W 4/025* (2013.01)

(58) Field of Classification Search
CPC ........ H04W 4/02; H04W 4/025; H04L 63/107
(Continued)

(56) References Cited

U.S. PATENT DOCUMENTS

| 8,447,332 B2* | 5/2013 | Weinreich | G01S 5/0036 |
| | | | 370/338 |
| 2008/0172738 A1* | 7/2008 | Bates | G06F 17/30887 |
| | | | 726/22 |

(Continued)

FOREIGN PATENT DOCUMENTS

| CN | 101677323 | 3/2010 |
| CN | 102075853 | 5/2011 |

(Continued)

OTHER PUBLICATIONS

Travel assistance device: utilising global positioning system-enabled mobile phones to aid transit riders with special needs, Berbeau et al, IEEE, IET Intelligent Transport Systems, vol. 4, Issue: 1, Mar. 2010.*

(Continued)

*Primary Examiner* — James Turchen
*Assistant Examiner* — Jahangir Kabir
(74) *Attorney, Agent, or Firm* — Ladas & Parry LLP

(57) ABSTRACT

A method for obtaining peripheral information method is disclosed herein and includes steps of: receiving a request for obtaining peripheral information, and the request for obtaining peripheral information includes a connection request for access to a third-party website; obtaining the current location information of a mobile terminal according to the connection request; obtaining a link of the third-party website; obtaining the current location information of a mobile terminal according to the connection request; obtaining a link of the third-party website according to domain name information of the third-party website and the current (Continued)

location information of the mobile terminal; making the mobile terminal jump to a page of the third-party website, so as to obtain peripheral information based on the current location of the mobile terminal and the information is provided by the third-party website.

14 Claims, 5 Drawing Sheets

(58) Field of Classification Search
    USPC .................................. 713/154, 153; 726/12
    See application file for complete search history.

(56) References Cited

U.S. PATENT DOCUMENTS

| | | | | |
|---|---|---|---|---|
| 2008/0214209 | A1* | 9/2008 | Ratnakar | H04W 4/02 455/456.1 |
| 2008/0268870 | A1* | 10/2008 | Houri | 455/456.1 |
| 2009/0089149 | A1* | 4/2009 | Lerner | G01C 21/32 705/7.34 |
| 2009/0300768 | A1* | 12/2009 | Krishnamurthy | G06F 21/552 726/26 |
| 2010/0325194 | A1* | 12/2010 | Williamson et al. | 709/203 |
| 2011/0230203 | A1 | 9/2011 | Ihara et al. | |
| 2011/0244892 | A1* | 10/2011 | MacManus | H04W 4/02 455/457 |
| 2012/0005285 | A1* | 1/2012 | Lin | 709/206 |
| 2012/0122476 | A1* | 5/2012 | Lee | H04W 4/02 455/456.1 |
| 2012/0295575 | A1 | 11/2012 | Nam | |

FOREIGN PATENT DOCUMENTS

| | | |
|---|---|---|
| CN | 102147903 | 8/2011 |
| CN | 102196032 A | 9/2011 |
| KR | 20110086911 A | 8/2011 |

OTHER PUBLICATIONS

Location-based Services using Image Search, Vertongen et al, IEEE Applications of Computer Vision, 2008. WACV 2008. IEEE, Workshop on, Jun. 2008.*

The Current State of Commercial Location-Based Service Offerings in Australia, Abbas et al, IEEE, Mobile Business, 2009. ICMB 2009. Eighth International Conference, Jul. 2009.*

* cited by examiner

METHOD AND SYSTEM FOR OBTAINING PERIPHERAL INFORMATION, AND LOCATION PROXY SERVER

CROSS-REFERENCE TO RELATED APPLICATIONS

This application represents a National Stage of PCT/CN2012/086750, filed on Dec. 17, 2012 which claims the benefit and priority of Chinese Application No. 201110452331.5, filed on Dec. 29, 2011. The entire disclosure of each of the above applications is incorporated herein by reference.

FIELD OF THE INVENTION

The present disclosure relates to a field of mobile communication, and more particularly relates to a method and system for obtaining peripheral information and location proxy server.

BACKGROUND OF THE INVENTION

Since the development of mobile terminal, more and more mobile terminals, such as cellular phones, include an electronic map searching function. Therefore, a paper map searching can be replaced. Map searching on mobile phones is faster and more convenient.

When a user is traveling or goes shopping, the user would not only like to position his location or the destination's location, but may also want to know any peripheral information, such as shops, banks, schools, hospitals and so on, surrounding the user's location or the destination's location.

The conventional technique is to perform a location searching function by implementing a map searching software, and the current location of the mobile terminal is inputted in the map searching software to directly obtain and display information related to the geographic location or the destination's location. However, the drawback of the conventional technique is that the peripheral information of the user's location cannot be searched from the map searching software if the user is not sure where he is. When the user uploads the current location of the mobile terminal to the map searching software, the peripheral information received from the software is simple. For example, only the name or location information of peripheral places, such as shops, banks, schools, hospitals and so on, can be obtained and specific information cannot be obtained. The user's experience is poor.

The conventional technique further provides a method for searching peripheral information. The user can input the current location of the mobile terminal into a service website, which provides a professional and specific information service, to find out advanced peripheral information about the current location of the mobile terminal. However, the drawback of the present technique is that the user cannot search the peripheral information of the user's location if the user is not sure of his precise location.

SUMMARY OF THE INVENTION

One object in the embodiment of the present disclosure is to provide a method and system for obtaining peripheral information as well as a location proxy server compatible with the mobile terminal of the user. Therefore, the accessing speed of the user is enhanced and the obtained information is more accurate. The professional peripheral information service provided by the third-party website is available in accordance with the current location of the mobile terminal, so the user's experience is enhanced.

In one aspect, the present disclosure provides a method and system for obtaining peripheral information as well as a location proxy service or a storage medium is provided in the embodiment of the present disclosure, the technical solution comprises:

A method for obtaining peripheral information and the method comprises:

receiving a request for obtaining peripheral information and request for obtaining peripheral information including a connecting request for visiting a third-party website;

determining whether or not the third-party website allows to be visited by a mobile terminal, if yes, then obtaining the current location information of the mobile terminal in accordance with the connecting request and encrypting the obtained current location information of the mobile terminal;

generating a hyperlink for the third-party website in accordance with domain name information of the third-party website and the encrypted current location information of the mobile terminal;

decrypting the encrypted current location information of the mobile terminal and directing the mobile terminal to a page of the third-party website in accordance with the hyperlink for the third-party website;

obtaining the peripheral information of the current location information of the mobile terminal provided by the third-party website.

A method for obtaining peripheral information and the method comprises:

receiving a request for obtaining peripheral information and the request for obtaining the peripheral information includes a connecting request for visiting a third-party website;

obtaining current location information of a mobile terminal in accordance with the connecting request;

generating a hyperlink for the third-party website in accordance with domain name information of the third-party website and the current location information of the mobile terminal;

going to a corresponding page of the third-party website according to the hyperlink for the third-party website controlled by the mobile terminal and obtaining the peripheral information from the third-party website in accordance with the current location information provided by the mobile terminal.

A location proxy server comprises:

a receiving module configured for receiving a request for obtaining peripheral information and the request for obtaining peripheral information including a connecting request for visiting a third-party website;

a current location information obtaining module configured for obtaining current location information of a mobile terminal according to the connecting request;

a third-party website hyperlink obtaining module configured for generating a third-party website hyperlink according to domain name information of the third-party website and the current location information of the mobile terminal;

a peripheral information obtaining module configured for going to a corresponding page of the third-party website according to the third-party website hyperlink controlled by the mobile terminal and obtaining the peripheral information from the third-party website according to the current location information of the mobile terminal.

A system for obtaining peripheral information, and the system for obtaining peripheral information comprises a mobile terminal, a location proxy server, a location business server, and the system is further includes a third-party website for providing peripheral information, wherein:

the mobile terminal is configured for sending a request including a connecting request for visiting a third-party website to obtain peripheral information;

the location proxy server is configured for receiving the connecting request and obtaining a current location information obtaining manner so as to send a request for obtaining the current location information to the location business server;

the location business server is configured for obtaining the current location information of the mobile terminal according to the current location information obtaining request;

the location proxy server is configured for generating a third-party hyperlink according to domain name information of the third-party website and the current location information of the mobile terminal;

the mobile terminal is configured for going to a page of the third-party website according to the third-party website hyperlink and obtaining the peripheral information of the mobile terminal provided by the third-party website.

A storage medium for storing calculator executable command, wherein the calculator executable command is configured for a calculator to perform following steps: receiving a request for obtaining peripheral information and the request for obtaining peripheral information includes a connecting request for visiting a third-party website; determining whether or not the third-party website allows to be visited, if yes, then acquiring and encrypting a current location information of a mobile terminal according to the connecting request; generating a third-party website hyperlink according to domain name information of the third-party website and the encrypted current location information of the mobile terminal; decrypting the encrypted current location information of the mobile terminal and the mobile terminal going to a page of the third-party website according to the hyperlink for the third-party website; obtaining the peripheral information from the third-party website according to the current location information of the mobile terminal.

The advantage of the present disclosure is:

When user wants to visit a third-party website to obtain peripheral information of the current location information, the user determines whether or not the current location information obtaining manner can be uploaded to accomplish user terminal compatibility. The current location information of the mobile terminal is obtained in accordance with the current location information obtaining manner and combines with the domain name information of the third-party website to generate the hyperlink of the third-party website. The accuracy is extremely high. The current location information is further encrypted and combines with the domain name information of the third-party website to generate the hyperlink of the third-party website. At this moment, the third-party website allows to be visited in accordance with the current location information of the user to provide a professional service so as to enhance the user's experience.

DETAILED DESCRIPTION OF THE PREFERRED EMBODIMENTS

The above-mentioned description of the present disclosure can be best understood by referring to the following detailed description of the preferred embodiments and the accompanying drawings. The word "mobile terminal" can be a cellular phone or any other portable apparatuses to provide browsing and can have its specific location indicated.

A method for obtaining peripheral information is provided in the present disclosure. When user wants to visit a third-party website, the user's permission is requested and the current location information can be uploaded to accomplish user terminal compatibility. If the user won't upload the current location information, a normal method is implemented to visit the third-party website. Otherwise, the current location of the mobile terminal is obtained by the current location information uploaded by the user. In addition, the current location information is encrypted and combined with the domain name information of the third-party website to generate a hyperlink for the third-party website so as to enhance the security and the accuracy as well as the user's experience. The third-party website is a professional website to provide detailed peripheral information about the current location in accordance with the user's location information. For example, the location, size, sale type or reputation of the store surrounding the location can be provided herein. Similarly, detailed information of the places, such as hospitals, markets, stations and so on, can be provided herein instead of the location name and a brief description only. The practical procedure for obtaining peripheral information of the current location is shown in FIG. 1.

Figure 1:
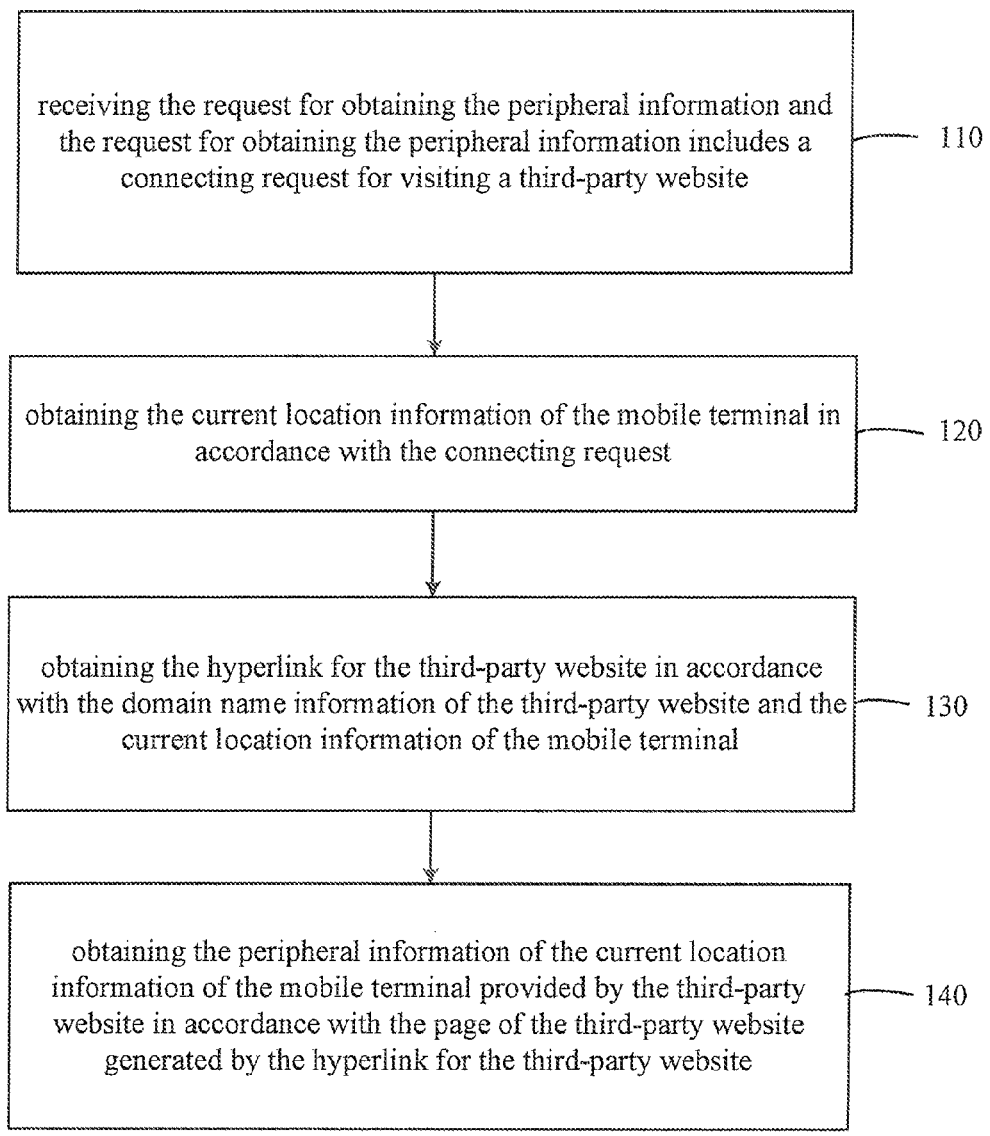
FIG. 1 illustrates a flowchart of a method for obtaining peripheral information in one embodiment of the present disclosure.

FIG. 1 illustrates a flowchart of a method for obtaining peripheral information in one embodiment of the present disclosure. The method for obtaining peripheral information comprises:

In step 110, the request for obtaining peripheral information is received and the request for obtaining peripheral information includes a connecting request for visiting a third-party website.

Generally, when visiting the third-party website, which can provide peripheral information about the current location, the request for obtaining the peripheral information is sent first and the connecting request in the request for obtaining peripheral information is generated from the hyperlink for the third-party website clicked by the mobile terminal. When the mobile terminal clicks the hyperlink for the third-party website, the connecting request to visit the third-party website is generated. Generally, the hyperlink includes location proxy server information, domain name information and the complete link of the third-party website except the domain name information. The format of the hyperlink is: location proxy server? site ID (such as the domain name information of the website)&the rest of URL (Universal Resource Locator). For example, when one location proxy server is chosen, the hyperlink for the third-party website can be www.ibs.imtt.qq.com?qs=1&qp=abc, where the qs is the site ID of the third-party website corresponding to the domain name information of the third-party website and the qp is the rest of the complete link except the domain name information of the third-party website. The location proxy server herein is a Location Based Service (LBS) server.

Accordingly, the hyperlink for the third-party website is related to the location proxy server and the link of the third-party website. If the mobile terminal would like to know peripheral store information of the current location from the third-party website, the location proxy server and the location business server are implemented to determine the location of the mobile terminal and transmit the location information of the mobile terminal to the third-party website. The third-party website is a professional website, which can provide practical peripheral information related to the stores.

In addition, in a preferred embodiment, in order to guaranty that the third-party website allows to be visited by the mobile terminal, the domain name information of the third-party website is requested to be authorized so as to determine whether or not the third-party website allows to be visited. If yes, then the step of obtaining the location information of the mobile terminal is processed. If no, then the connecting request is terminated and the procedure is to return to the browser of the mobile terminal.

In step 120, the current location information of the mobile terminal is obtained in accordance with the connecting request.

In practice, the current location information obtaining manner of the mobile terminal is obtained from the connecting request. The current location information of the mobile terminal is obtained in accordance with the current location information obtaining manner. A request for obtaining the current location information obtaining manner is sent to the mobile terminal and the mobile terminal can upload the current location information obtaining manner in accordance with the request for obtaining the current location information obtaining manner. The current location information of the mobile terminal is obtained in accordance with the uploaded current location information obtaining manner. In other words, the connecting request determines whether the connecting request includes the current location information obtaining manner. The current location information obtaining manner is obtained from the connecting request if the current location information obtaining manner exists. A request for obtaining the current location information obtaining manner is sent to the mobile terminal if the current location information obtaining manner does not exist. The mobile terminal is requested to upload the current location information obtaining manner in accordance with the current location information obtaining manner so as to obtain the current location information of the mobile terminal according to the uploaded current location information obtaining manner.

Usually, the current location information corresponding to the mobile terminal is obtained without encrypting. In order to guarantee the security of the information of the mobile terminal, the current location information corresponding to the mobile terminal is generally encrypted and then decrypted when going to the third-party website according to the encrypting method.

Practically, when obtaining the current location information of the mobile terminal, it is necessary to determine whether a head of the connecting request includes information of the current location information obtaining manner to determine the location information of the mobile terminal. If no, then the request for obtaining the current location information obtaining manner is transmitted to the mobile terminal and the mobile terminal decides whether or not to upload the current location information obtaining manner when the mobile terminal receives the request for obtaining the current location information obtaining manner. When the current location information obtaining manner is uploaded, the current location information of the mobile terminal is obtained from the location proxy server in accordance with the current location information obtaining manner transmitted from the mobile terminal. Accordingly, when the current location information of the mobile terminal is obtained, it is necessary to communicate with the mobile terminal. At this moment, the user can upload the current location information obtaining manner corresponding to the mobile terminal in accordance with the user need. Of course, if the user doesn't want to upload the current location information obtaining manner corresponding to the mobile terminal, the mobile terminal can refuse to upload the current location information obtaining manner.

In practice, the current location information of the mobile terminal is generally obtained in accordance with GPS (Global Positioning System) and WIFI (Wireless Fidelity). Therefore, the location proxy server will determine which manner the mobile terminal can use to obtain the current location information. In other words, the location proxy server can determine which manner can be used to obtain the current location information in accordance with the current location information obtaining manner.

According to the object mentioned above, the location proxy server firstly determines whether the head of the connecting request includes the current location information obtaining manner, which is used to confirm the mobile terminal location information (such as at least one of the manners (base station, GPS, or WIFI) to obtain the geographic location of the mobile terminal). If no, then the request for obtaining the current location information obtaining manner is sent to the mobile terminal. The mobile terminal receives the request for obtaining the current location information obtaining manner to decide whether or not to upload the current location information obtaining manner to the location proxy server. If yes, then the information for obtaining the current location information obtaining manner is sent to the location proxy server. If no, then the information for obtaining the current location information obtaining manner is not sent to the location proxy server.

In step 130, the hyperlink for the third-party website is obtained in accordance with the domain name information of the third-party website and the current location information of the mobile terminal.

In order to guarantee the reliability and security of the generated hyperlink for the third-party website, an encrypting manner is used to encrypt the current location information of the mobile terminal, which is used to generate the hyperlink for the third-party website. Practically, the obtained current location information of the mobile terminal is encrypted and the hyperlink for the third-party website is generated in accordance with the domain name information of the third-party website and the encrypted current location information of the mobile terminal.

It should be noted that, in order to guarantee the security of the current location information of the mobile terminal, the current location information obtaining manner uploaded to the location proxy server by the mobile terminal can also be encrypted. After the location proxy server receives the current location information obtaining manner, the location proxy server descripts and determines which manner is implemented by the mobile terminal to obtain the current location information.

When the location proxy server receives the rejection of the uploading of the current location information from the mobile terminal or doesn't receive the uploading of the current location information from the mobile terminal or fails to receive the uploading of the current location information from the mobile terminal, it means that the mobile terminal won't provide the current location information to the third-party website and the normal browsing manner is used in the third-party website. At this moment, the current location information of the mobile terminal won't be displayed on the third-party website. Therefore, the hyperlink for the third-party website is generated by the domain name information of the third-party website and the complete link of the third-party website except the domain name information. The browser of the mobile terminal is going directly to the page of the third-party website for the user to browse. Correspondingly, the return code information is qret=1.

In step 140, peripheral information of the current location information of the mobile terminal provided by the third-party website is obtained in accordance with the page of the third-party website generated by the hyperlink for the third-party website.

It should be noted that the obtained current location information of the mobile terminal generally includes location information and geographic information. The location information is general information, such as university names, hospital names and so on. Since the location information of the mobile terminal is only to determine the approximate location of the mobile terminal, the accurate practical location of the mobile terminal is not determined. Accurate geographic information of the mobile terminal is generally required. Therefore, it is necessary to obtain the geographic information of the mobile terminal.

Correspondingly, in one embodiment, the hyperlink for the third-party website is generated in accordance with the domain name information as well as the location information and the geographic information of the mobile terminal. When the mobile terminal decides to upload the current location information obtaining manner, the location proxy server will obtain the current location information (including the location information and the geographic information) of the mobile terminal. Generally, in order to guarantee the security, before the hyperlink for the third-party website is generated, the location information and the geographic information in the current location information of the mobile terminal is encrypted first and the hyperlink for the third-party website is generated in accordance with the domain name information of the third-party website as well as the encrypted location information and the encrypted geographic information of the mobile terminal. For example, the hyperlink is: www.test.com/abc/bcd?a=1&b=2&qaddress=university_name&qgps=23.855000,61.4 48082&qret=0, where the qaddress is the location information and the qgps is the geographic information of the mobile terminal. The qaddress and the qgps are encrypted (such as encrypted by DES) and the content of the qaddress and the qgps shown herein is to provide a clearer description. It should be noted that the (yet is the return code information and the parameters of the qaddress and the qgps are existed when the qret=0. In another embodiment, the hyperlink for the third-party website is generated in accordance with the domain name information of the third-party website, one of the location information and the geographic information in the mobile terminal. For example, the hyperlink for the third-party website is generated as: www.test.com/abc/bcd?a=1&2qaddress=university_name&qret=0 or the hyperlink for the third-party website is generated as: www-.test.com/abc/bcd?a=1&2&qgps=23.855000, 61.448082&qret=0, where the qaddress is the location information and the qgps is the geographic information of the mobile terminal. In one preferred embodiment, either the location information or the geographic information is encrypted and the hyperlink for the third-party website is generated in accordance with the encrypted information and the domain name information of the third-party website.

Figure 2:
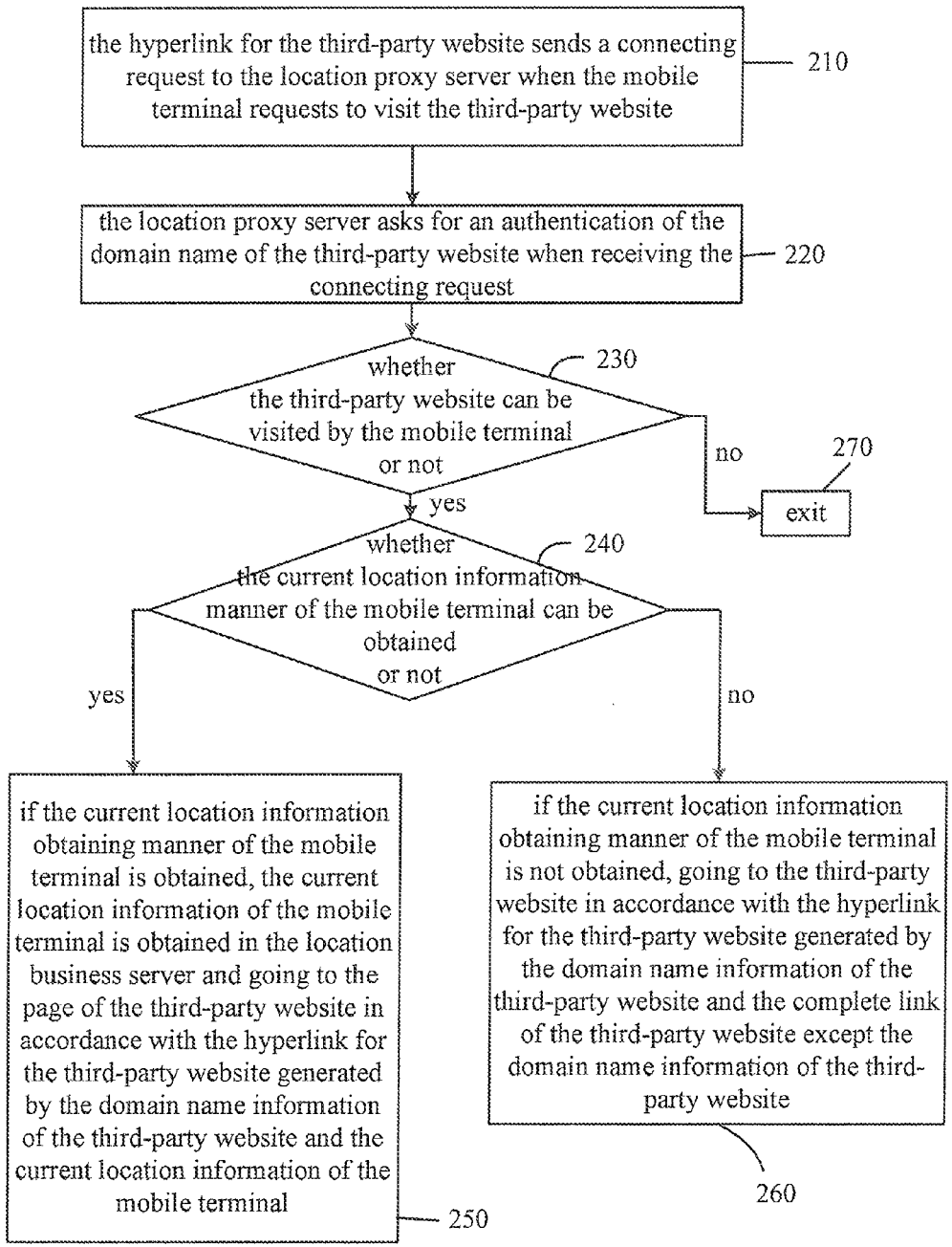
FIG. 2 illustrates a flow chart of a manner for obtaining the peripheral information in second embodiment of the present disclosure.

FIG. 2 illustrates a flow chart of a manner for obtaining the peripheral information in the second embodiment of the present disclosure. The method comprises:

In step 210, the hyperlink for the third-party website sends a connecting request to the location proxy server when the mobile terminal requests to visit the third-party website.

In step 220, the location proxy server asks for an authentication of the domain name of the third-party website when receiving the connecting request.

When the user clicks the hyperlink for the third-party website on the mobile terminal and wants to visit the third-party website, it is necessary to perform the authentication for the domain name of the third-party website to ensure that the mobile terminal can visit the corresponding third-party website.

In step 230, it is determined whether or not the third-party website allows to be visited by the mobile terminal.

After the location proxy server performs the authentication for the domain name of the third-party website, the third-party website is determined whether or not the third-party website allows to be visited by the mobile terminal. Only when the mobile terminal has priority to visit the third-party website can the following steps be processed. Otherwise, going to step 270 and the request for visiting the third-party website is terminated.

In step 240, if the third-party website allows to be visited by the mobile terminal, it is to determine whether or not the current location information manner of the mobile terminal can be obtained.

In step 250, if the current location information obtaining manner of the mobile terminal is obtained, the current location information of the mobile terminal is obtained in the location business server. The user goes to the page of the third-party website from the mobile terminal in accordance with the hyperlink for the third-party website generated by the domain name information of the third-party website and the current location information of the mobile terminal.

In step 260, if the current location information obtaining manner of the mobile terminal is not obtained, the user goes to the third-party website from the mobile terminal in accordance with the hyperlink for the third-party website generated by the domain name information of the third-party website and the complete link of the third-party website except the domain name information of the third-party website.

Figure 3:
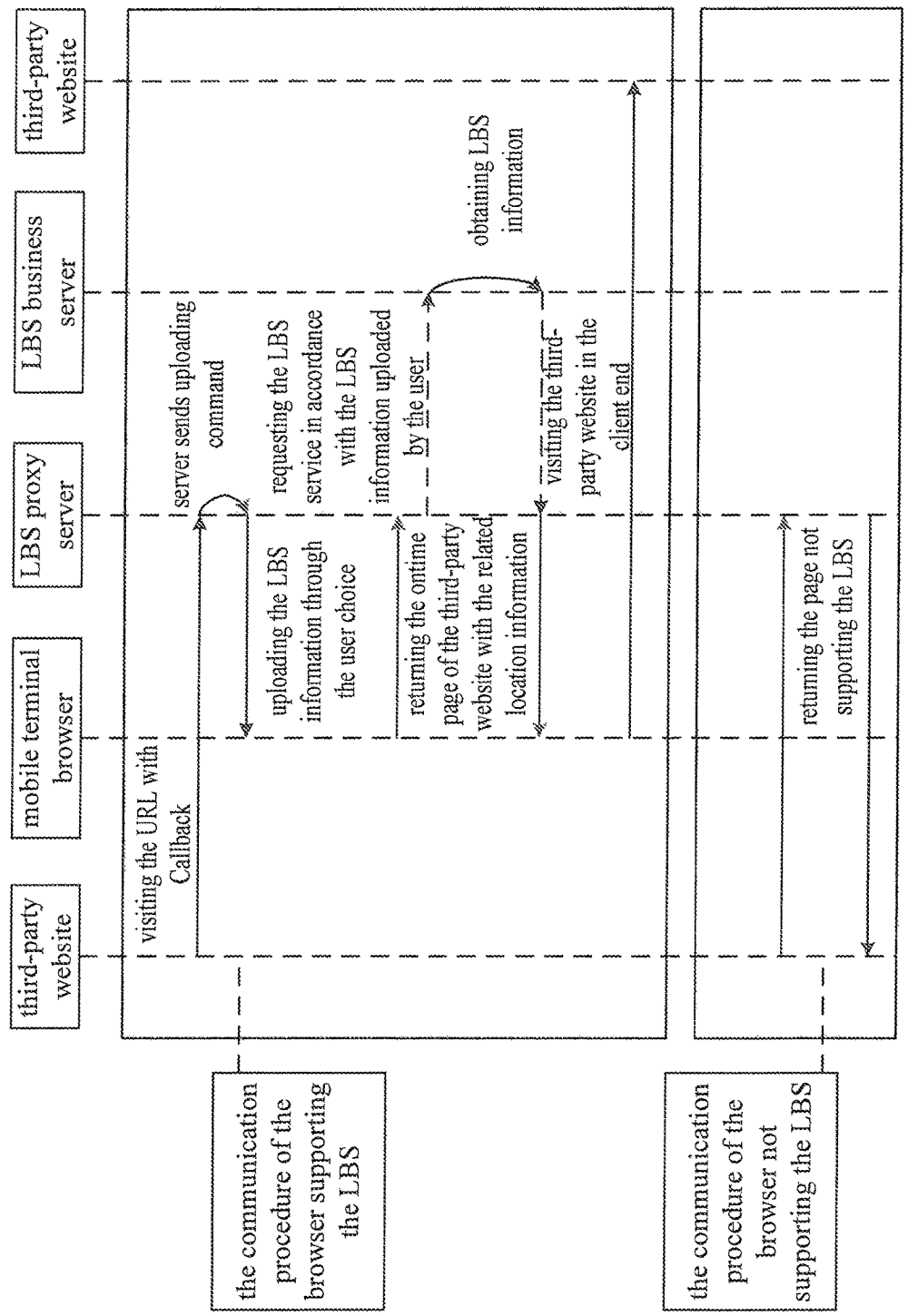
FIG. 3 illustrates a view of a communicative procedure between the browser and the third-party website in third embodiment of the present disclosure.

FIG. 3 illustrates a view of a communicative procedure between the browser and the third-party website in the third embodiment of the present disclosure. The communicative procedure between the browser of the mobile terminal and the third-party website includes a communicative procedure with the browser, which supports the LBS (Location Based Service) or a communicative procedure with the browser, which doesn't support the LBS. The communicative procedure with the browser, which supports the LBS is: the third-party website will visit the LBS proxy server by the web address with CallBack. The LBS proxy server sends an uploading command to the browser of the mobile terminal. The location proxy server requests LBS business server in accordance with the LBS information uploaded by the user and the LBS business server obtains the LBS information and sends an immediate page, which includes the related current location information, of the third-party website to the browser of the mobile terminal. Therefore, the user can visit the third-party website form the browser of the mobile terminal. The communicative procedure with the browser, which doesn't support the LBS, is to go to the page, which doesn't support the LBS, by the location proxy server with the LBS information.

In summary, a method for obtaining the peripheral information is provided in the present disclosure and the method can transmit the encrypted information between the system servers in accordance with the user choice and the compatibility of the mobile terminal to guarantee the security of the information and enhance the accessing speed for the user. The current location information of the mobile terminal encrypted by an encrypting protocol of the third-party agreement is transmitted to the third party and the third party will provide specific service. The security of the transmitted information is guaranteed and more professional and better location information service can be provided for the user.

A location proxy server is also provided in the present disclosure. When the user wants to visit the third-party website, the request to upload the current location information obtaining manner is confirmed from the user so as to achieve the compatibility of the mobile terminal. If the user won't upload the current location information obtaining manner, the page of the third-party website is visited in the normal manner. Otherwise, the current location information obtaining manner uploaded by the user obtains the current location. The current location information is encrypted and combined with the domain name information of the third-party website to generate the hyperlink for the third-party website. Security is enhanced and the user's experience is better. The practical structure is shown in FIG. 4.

Figure 4:
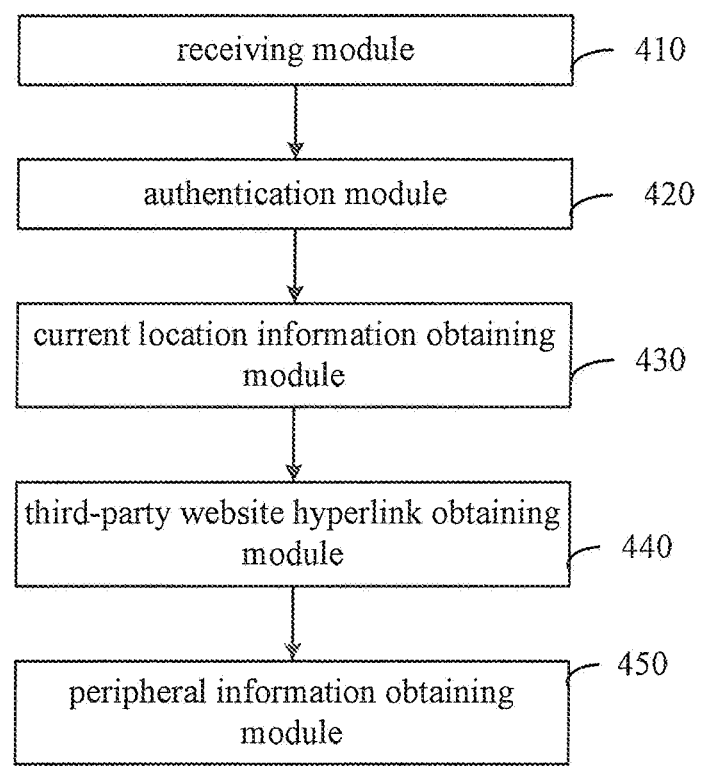
FIG. 4 illustrates a block diagram of a location proxy server provided in fourth embodiment of the present disclosure.

FIG. 4 illustrates a block diagram of a location proxy server provided in the fourth embodiment of the present disclosure. The location proxy server includes a receiving module 410, a current location information obtaining module 430, a third-party website hyperlink obtaining module 440 and a peripheral information obtaining module 450. In addition, the system further includes an authentication module 420.

The receiving module 410 is configured for receiving a request for obtaining peripheral information and the request for obtaining peripheral information includes a connecting request for visiting a third-party website.

Generally, when the user would like to obtain peripheral information on the mobile terminal, a request for obtaining peripheral information is sent and the third-party website is a specific website to provide peripheral information. The user is going to visit the third-party website providing peripheral information at last. Therefore, the request for obtaining the peripheral information includes a connecting request for visiting the third-party website. When the hyperlink for the third-party website is requested to be visited by a mobile terminal, the hyperlink sends a connecting request for visiting the third-party website to the location proxy server, Practically, the mobile terminal can visit the third-party website and the hyperlink for the third-party website includes the location proxy server information, the domain name information of the third-party website and the complete link of the third-party website except the domain name information. The format of the hyperlink is: location proxy server?website_ID (the domain name of the website)& the complete link of the third-party website except the domain name information. For example, when the location proxy server in Tencent is chosen, the hyperlink for the third-party website can be: www.ibs.imtt.qq.com?qs=1&qp=abc, in which the qs is the website ID of the third-party website corresponding to the domain name information of the third-party website and the qp is the rest of the complete hyperlink except the domain name information of the third-party website.

Accordingly, the hyperlink for the third-party website is related to the location proxy server and the hyperlink for the third-party website. Therefore, if the user would like to know peripheral store information of the current location information on the third-party website from the mobile terminal, the location proxy server is used to determine the current location information of the mobile terminal and the current location information of the mobile terminal is transmitted to the third-party website.

The authentication module 420 is configured for performing an authentication for the third-party website to determine whether or not the third-party website allows to be visited. If yes, then the mobile terminal determines whether or not the current location information of the mobile terminal can be obtained.

When the user clicks the hyperlink of the third-party website from the mobile terminal, in order to guarantee the user can visit the third-party website, the domain name of the third-party website is requested to perform the authentication after the connecting request is received.

The current location information obtaining module 430 is configured for obtaining the current location information of a mobile terminal in accordance with the connecting request.

In practice, the current location information obtaining manner is obtained in the connecting request. The current location information of the mobile terminal is obtained in accordance with the current location information obtaining manner. The request for obtaining the current location information obtaining manner is transmitted to the mobile terminal and the mobile terminal can upload the current location information obtaining manner in accordance with the request for obtaining the current location information obtaining manner. The current location information of the mobile terminal is obtained in accordance with the uploaded current location information obtaining manner. In other words, it is to deter mine whether the connecting request includes the current location information obtaining manner. If the current location information obtaining manner exists, the current location information and the geographic information of the mobile terminal is obtained in accordance with the current location information obtaining manner. If the current location information obtaining manner does not exist, the request for obtaining the current location information obtaining manner is sent to the mobile terminal and the mobile terminal uploads the current location obtaining manner in accordance with the request for obtaining the current location obtaining manner and the current location information of the mobile terminal is obtained in accordance with the current location information obtaining manner uploaded by the mobile terminal.

Generally, the obtained current location information of the corresponding mobile terminal is not encrypted. In order to guarantee the security of the information of the mobile terminal, the corresponding current location information of the mobile terminal will generally be encrypted and then decrypted by the encrypting manner when going to the third-party website.

Practically, when the current location information of the mobile terminal is obtained, it is necessary to determine whether a head of the connecting request includes information of the current location information obtaining manner to determine the location information of the mobile terminal. If no, then the request for obtaining the current location information is transmitted to the mobile terminal and the mobile terminal decides whether or not to upload the current location information obtaining manner when the mobile terminal receives the request for obtaining the current location information. Accordingly, when the current location information of the mobile terminal is obtained, it is necessary to communicate with the mobile terminal. At this moment, the user can upload the current location information obtaining manner of the corresponding mobile terminal in accordance with the user need. Of course, if the user doesn't want to upload the current location information obtaining manner corresponding to the mobile terminal, the mobile terminal can refuse to upload the current location information obtaining manner.

Practically, the current location information of the mobile terminal is generally obtained in accordance with GPS (Global Positioning System) and WIFI (Wireless Fidelity). Therefore, the location proxy server will determine which manner the mobile terminal can use to obtain the current location information. In other words, the location proxy server can determine which manner can be used to obtain the current location information in accordance with the current location information obtaining manner.

According to the objects mentioned above, the location proxy server firstly determines whether the head of the connecting request includes the current location information obtaining manner information to confirm the mobile terminal location information (such as at least one of the manner (base station, GPS, or WIFI) to obtain the geographic location of the mobile terminal). If no, then the request for obtaining the current location information obtaining manner is sent to the mobile terminal. The mobile terminal receives the request for obtaining the current location information obtaining manner to decide whether or not to upload the current location information obtaining manner to the location proxy server. If yes, then the information for obtaining the current location information obtaining manner is sent to the location proxy server. Otherwise, the information for obtaining the current location information obtaining manner is not sent to the location proxy server.

It should be noted that, in order to guarantee the security of the current location information of the mobile terminal, the current location information obtaining manner uploaded to the location proxy server by the mobile terminal can also be encrypted. After the location proxy server receives the current location information obtaining manner, the location proxy server descripts and determines which manner is implemented by the mobile terminal to obtain the current location information.

The third-party website hyperlink obtaining module 440 is configured for generating a hyperlink for the third-party website according to the domain name information of the third-party website and the current location information of the mobile terminal.

In order to guarantee the reliability and security of the generated hyperlink for the third-party website, the third-party website hyperlink obtaining module 440 can encrypt the current location information, which is used to generate the hyperlink for the third-party website, of the mobile terminal. Practically, the obtained current location information of the mobile terminal is encrypted and the hyperlink for the third-party website is generated in accordance with the domain name information of the third-party website and the encrypted current location information of the mobile terminal The peripheral information obtaining module 450 is configured for going to a corresponding page of the third-party website according to the hyperlink for the third-party website controlled by the mobile terminal and obtaining the peripheral information from the third-party website in accordance with the current location information of the mobile terminal.

If the mobile terminal didn't upload the current location information obtaining manner or the acquirement of the current location of the mobile terminal fails, the hyperlink for the third-party website is generated in accordance with the domain name information of the third-party website and the complete link of the third-party website except the domain name information of the third-party website. Therefore, the user can go to the page of the third-party website on the mobile phone.

When the location proxy server receives the information for the mobile terminal refusing to upload the current location information uploading manner or the location proxy server fails to receive the current location information uploading manner uploaded by the mobile terminal, it means that the user only browses the third-party web site in the normal way without providing the current location information to the third-party website and the location information and the geographic information of the mobile terminal is not requested to be shown on the third-party website. Therefore, the hyperlink for the third-party website is generated in accordance with the domain name information of the third-party website and the complete link of the third-party website except the domain name information of the third-party website and the user can directly browser the page of the third-party website from the mobile terminal.

It should be noted that, in practice, the obtained current location information of the mobile terminal includes the location information and the geographic information and that the location information is a kind of approximate information, such as university names, hospital names and so on. Generally, the accuracy of the geographic information of the mobile terminal needs to be confirmed. Thus, it is necessary to obtain the geographic information of the mobile terminal.

Correspondingly, in an embodiment, the hyperlink for the third-party website is generated in accordance with the domain name information of the third-party website as well as the location information and the geographic information of the mobile terminal. When the mobile terminal decides to upload the current location information uploading manner, the location proxy server will obtain the current location information (location information and geographic information) of the mobile terminal. Generally, in order to guarantee security, the location information and the geographic information in the current location information of the mobile terminal requires encryption and the hyperlink for the third-party website is generated in accordance with the domain name information of the third-party website as well as the encrypted location information and the encrypted geographic information of the mobile terminal. In another embodiment, the hyperlink for the third-party website is generated in accordance with the domain name information of the third-party website as well as either the location information or the geographic information of the mobile terminal. In one preferred embodiment, either the location information or the geographic information is encrypted and the hyperlink for the third-party website is generated in accordance with the encrypted information.

It should be noted that the location proxy server provided in the previous embodiments is described in accordance with the functional modules mentioned above. In practical application, different functional modules can be assigned and used to accomplish the function mentioned above and the internal structure of the device can assign different functional modules to accomplish all of or part of the function mentioned above. In addition, since the function of the location proxy server provided in the previous embodiment is similar to the method for obtaining peripheral information, the detail description of the location service can be referred to the method embodiment and it is omitted herein.

In summary, the location proxy server provided in the present disclosure and the location proxy server can transmit the encrypted information between the system servers in accordance with the user's choice and the compatibility of the mobile terminal to guarantee the security of the information and enhance the accessing speed of the user. The current location information of the mobile terminal encrypted by an encrypting protocol of the third-party agreement is transmitted to the third party and the third party will provide specific services. The security of the information transmitting can be guaranteed and more professional and better location information service can be provided for the user.

Figure 5:
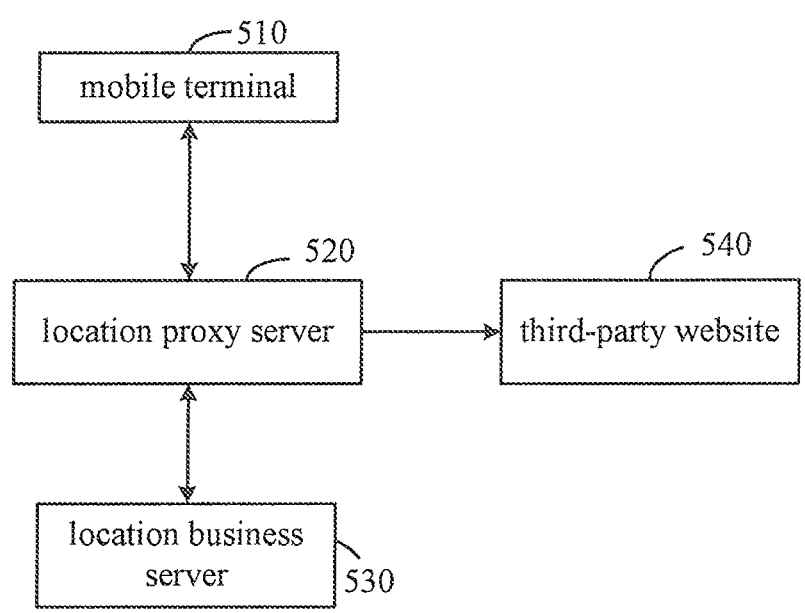
FIG. 5 illustrates a structural view of a system for obtaining the peripheral information provided in fifth embodiment of the present disclosure.

FIG. 5 illustrates a structural view of a system for obtaining peripheral information provided in the fifth embodiment of the present disclosure. The system for obtaining peripheral information includes a mobile terminal 510, a location proxy server 520, a location business server 530 and a third-party website 540.

The mobile terminal 510 transmits a request for obtaining peripheral information, which includes a connecting request for visiting the third-party website, to the location proxy server 520.

When the location proxy server 520 receives the connecting request from the mobile terminal 510, the location proxy server 520 determines whether or not the connecting request includes the current location information obtaining manner. If the current location information obtaining manner exists, then the location proxy server transmits a request for obtaining current location information to the location business server 530. If the current location information obtaining manner does not existed in the connecting request, a request for obtaining the current location information obtaining manner is sent to the mobile terminal 510, and the mobile terminal 510 uploads the current location information obtaining manner in accordance with the request. After the mobile terminal 510 uploads the current location information obtaining manner, the request for obtaining the current location information is transmitted to the location business server 530.

The location business server 530 searches and obtains the current location information of the mobile terminal 510 in accordance with the request for obtaining the current location information.

The location proxy server 520 generates the hyperlink for the third-party website in accordance with the domain name information of the third-party website and the current location information of the mobile terminal 510.

The mobile terminal 510 obtains peripheral information about the current location information of the mobile terminal 510 provided by the third-party website in accordance with the hyperlink for the third-party website.

It should be noted that the location proxy server provided in the previous embodiments is described in accordance with the functional modules mentioned above. In practical application, different functional modules can be assigned and used to accomplish the function mentioned above and the internal structure of the device can assign different functional modules to accomplish all of or part of the function mentioned above. In addition, since the function of the location proxy server provided in the previous embodiment is similar to the method for obtaining the peripheral information, the detail description of the location service can be referred to the method embodiment and it is omitted herein.

The exemplary approaches described may be carried out using any suitable combinations of software, firmware and hardware and are not limited to any particular combinations of such. Computer program instructions for implementing the exemplary approaches described herein may be embodied on a tangible, non-transitory, computer-readable storage medium, such as a magnetic disk or other magnetic memory, an optical disk (e.g., DVD) or other optical memory, RAM, ROM, or any other suitable memory such as Flash memory, memory cards, etc.

As described above, the present disclosure has been described with preferred embodiments thereof and it is understood that many changes and modifications to the described embodiments can be carried out without departing from the scope and the spirit of the invention that is intended to be limited only by the appended claims.

What is claimed is:

1. A method for obtaining peripheral information, comprising:

encrypting, by a location proxy server, a current location data of a mobile terminal;

generating, by the location proxy server, an URL (Universal Resource Locator) address, which is constructed using domain name of a third-party website and the encrypted current location data of the mobile terminal that is encrypted;

receiving a request for obtaining peripheral information at the location proxy server, the request including a connecting request for visiting the third-party website from the mobile terminal by activating a hyperlink on the mobile terminal;

determining, by the location proxy server, whether or not the connecting request includes the current location data associated with the activated hyperlink;

acquiring the current location data in response to the determination that the current location data is included in the connecting request;

sending a request for acquiring the current location data from the mobile terminal in response to the determination that the current location data is not included in the connecting request, and receiving the current location data of the mobile terminal by the location proxy server;

decrypting, by the location proxy server, the encrypted current location data of the mobile terminal;

determining that the third-party website allows to be visited by the mobile terminal;

creating a connection to the third-party website from the mobile terminal to view a webpage of the third-party website; and obtaining, by the location proxy server, peripheral information of the current location data of the mobile terminal provided by the webpage of the third-party website;

formatting, by the location proxy server, the obtained peripheral information to generate formatted data; and allowing the mobile terminal to access the peripheral information of the current location data using the formatted data.

2. The method for obtaining peripheral information according to claim 1, wherein the step of determining that the third-party website allows to be visited comprises:

performing an authentication for the third-party website to determine that the third-party website allows to be visited.

3. The method for obtaining peripheral information according to claim 1, wherein the current location data comprises location data and geographic data, and the step of encrypting, by the location proxy server, the current location data of the mobile terminal comprises:

encrypting either the location data or the geographic data obtained from the mobile terminal; and wherein the URL address is constructed using the domain name of the third-party website and the encrypted information from the location data or the geographic data.

4. The method for obtaining peripheral information according to claim 1, wherein the current location data comprises location data and geographic data, and the step of encrypting, by the location proxy server, the current location data of the mobile terminal comprises:

encrypting the location data and the geographic data obtained from the mobile terminal at the same time; and wherein the URL address is constructed using the domain name of the third-party website and the encrypted location data and the encrypted geographic data.

5. A location proxy server, connected to a mobile terminal, a location business server, and a third-party website, the location proxy server comprising:

a processor; and a memory for storing one or more program modules, that when executed by the processor, cause the processor to implement the following modules:

a current location information obtaining module configured for encrypting a current location data of the mobile terminal;

a third-party website hyperlink obtaining module configured for generating an URL (Universal Resource Locator) address, which is constructed using domain name of a third-party website and the encrypted current location data of the mobile terminal;

a receiving module configured for receiving a request for obtaining peripheral information at the location proxy server, the request including a connecting request for visiting the third-party website from the mobile terminal by activating a hyperlink on the mobile terminal;

a current location information obtaining module further configured for determining whether or not the connecting request includes the current location data associated with the activated hyperlink;

acquiring the current location data in response to the determination that the current location data is included in the connecting request; and sending a request for acquiring the current location data from the mobile terminal in response to the determination that the current location data is not included in the connecting request, and receiving the current location data of the mobile terminal;

a peripheral information obtaining module configured for decrypting the encrypted current location data of the mobile terminal;

determining that the third-party website allows to be visited by the mobile terminal;

creating a connection to the third-party website from the mobile terminal to view a webpage of the third-party website;

obtaining peripheral information of the current location data of the mobile terminal provided by the webpage of the third-party website;

formatting the obtained peripheral information to generate formatted data and allowing the mobile terminal to access the peripheral information of the current location data using the formatted data.

6. The location proxy server according to claim 5 further comprising:

an authentication module communicating with the third-party website and configured for performing authenticating for the third-party website to determine that the third-party website allows to be visited by the mobile terminal.

7. The location proxy server according to claim 5, wherein the current location data comprises location data and geographic data and the third-party website hyperlink obtaining module is further configured for generating the URL address constructed using the location data and the geographic data of the mobile terminal and the domain name of the third-party website.

8. The location proxy server according to claim 5, wherein the current location data comprises location data and geographic data and the third-party website hyperlink obtaining module is further configured for generating the URL address constructed using either the location data or the geographic data of the mobile terminal and the domain name of the third-party website.

9. The location proxy server according to claim 5, wherein the current location data comprises location data and geographic data and the third-party website hyperlink obtaining module is further configured for encrypting the location data and the geographic data of the mobile terminal and generating the URL address constructed using the encrypted location data and the encrypted geographic data of the mobile terminal and the domain name of the third-party website.

10. The location proxy server according to claim 5, wherein the current location data comprises location data and geographic data and the third-party website hyperlink obtaining module is further configured for encrypting either the location data or the geographic data of the mobile terminal and generating the URL address constructed using either the encrypted location data or the encrypted geographic data of the mobile terminal and the domain name of the third-party website.

11. A computer readable storage device, wherein the computer readable storage device comprises program instructions performing the following steps:

encrypting, by a location proxy server, a current location data of a mobile terminal;

generating, by the location proxy server, an URL (Universal Resource Locator) address, which is constructed using domain name of a third-party website and the encrypted current location data of the mobile terminal;

receiving a request for obtaining peripheral information at the location proxy server, the request including a connecting request for visiting the third-party website from the mobile terminal by activating a hyperlink on the mobile terminal;

determining, by the location proxy server, whether or not the connecting request includes the current location data associated with the activated hyperlink;

acquiring the current location data in response to the determination that the current location data is included in the connecting request;

sending a request for acquiring the current location data from the mobile terminal in response to the determination that the current location data is not included in the connecting request, and receiving the current location data of the mobile terminal by the location proxy server;

decrypting, by the location proxy server, the encrypted current location data of the mobile terminal;

determining that the third-party website allows to be visited by the mobile terminal;

creating a connection to the third-party website from the mobile terminal to view a webpage of the third-party website; and obtaining, by the location proxy server, peripheral information of the current location data of the mobile terminal provided by the webpage of the third-party website;

formatting, by the location proxy server, the obtained peripheral information to generate formatted data; and allowing the mobile terminal to access the peripheral information of the current location data using the formatted data.

12. The computer readable storage device according to claim 11, wherein the program instructions further perform the following steps: performing an authentication for the third-party website to determine that the third-party website allows to be visited.

13. The computer readable storage device according to claim 11, wherein the program instructions further perform the following steps: encrypting one piece of data from the location data and the geographic data obtained from the mobile terminal and generating the URL address constructed using the domain name of the third-party website and the encrypted information either from the location data or the geographic data.

14. The computer readable storage device according to claim 11, wherein the program instructions further perform the following steps: encrypting the location data and the geographic data obtained from the mobile terminal at the same time and generating the URL address constructed using the domain name of the third-party website and the encrypted location data and the encrypted geographic data.

* * * * *

UNITED STATES PATENT AND TRADEMARK OFFICE
CERTIFICATE OF CORRECTION

PATENT NO. : 9,584,529 B2
APPLICATION NO. : 14/125798
DATED : February 28, 2017
INVENTOR(S) : Xiaokang Su et al.

Page 1 of 1

It is certified that error appears in the above-identified patent and that said Letters Patent is hereby corrected as shown below:

On the Title Page

Item (71), delete "Tencent Technology (Shenzhen) Company Ltd." and insert --"Tencent Technology (Shenzhen) Company Limited--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*